April 1, 1969 W. SCHARF ET AL 3,435,965
TRANSPORT TROLLEY FOR PARKING GARAGES
Filed Sept. 8, 1965 Sheet 1 of 4

INVENTORS
WILLI SCHARF
HANS OVERLACH
BY Edwin E. Greigg
ATTORNEY

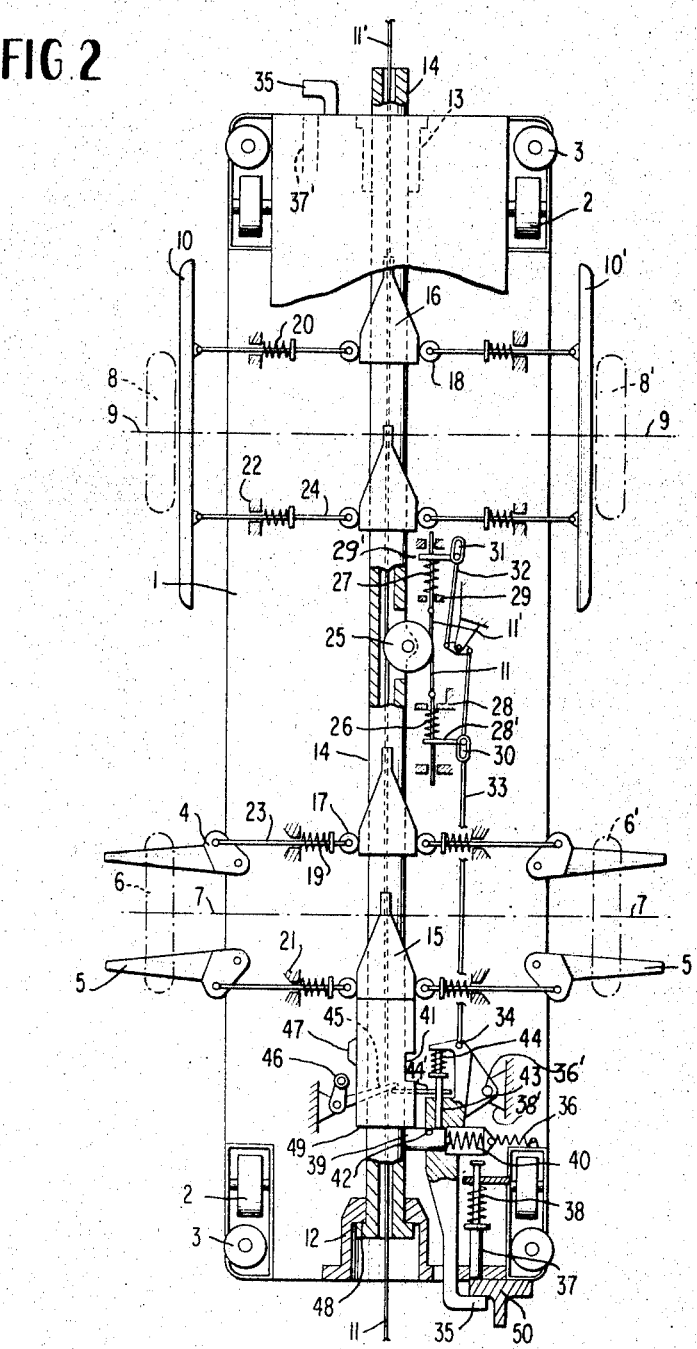

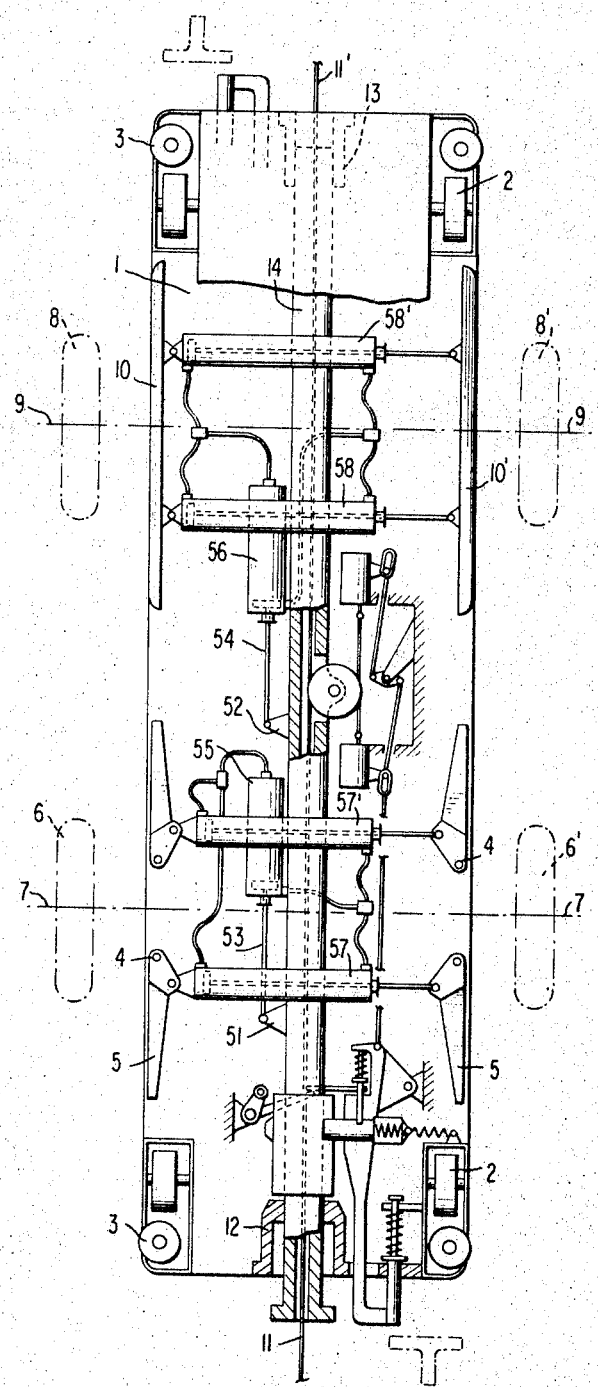

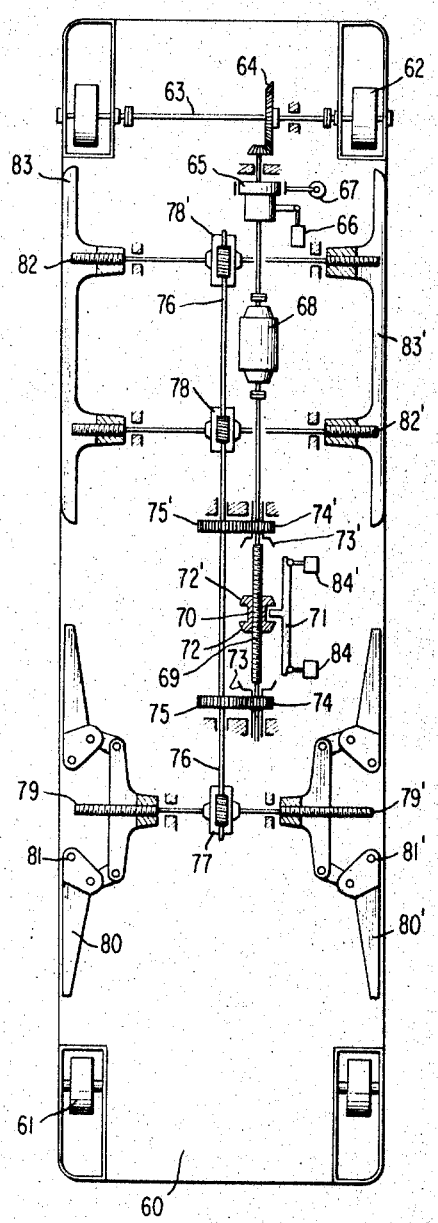

large/United States Patent Office 3,435,965
Patented Apr. 1, 1969

3,435,965
TRANSPORT TROLLEY FOR PARKING GARAGES
Willi Scharf, Gluckstrasse 4, Mannheim, Germany, and Hans Overlach, Klopstockstrasse 11, Berlin, Germany
Filed Sept. 8, 1965, Ser. No. 485,846
Int. Cl. E04h 6/00
U.S. Cl. 214—16.1                 4 Claims

ABSTRACT OF THE DISCLOSURE

A transport trolley displaceable by a propulsion force for conveying wheeled vehicles particularly in parking garages; the trolley is provided with extensible and retractable wheel engaging and guiding arms and rails. The actuation of said arms and rails is effected by means actuated by forces derived from the propulsion force itself.

---

This invention relates to a transport trolley used in parking garages for conveying wheeled vehicles, especially motor cars, to and from a parking space.

Transport trolleys of the above type are known in the art. According to one known embodiment, traction means moved by a drive system in the elevator cage serve to propel the transport trolley. In this embodiment the energy necessary for the operation of the elements for grasping wheeled vehicles is either supplied by electric cables or is stored on the transport trolley in the form of compressed air in containers which are refilled through filling valves at every stop of the elevator cage. The containers for compressed air, electric valves, operating cylinders, conduits and batteries for the control and numerous switches for the sequence control involve substantial expenses and necessitate an irreducible minimum height of the transport trolley in view of the volume taken up by the containers and valves.

Other known structures incorporate independent drive systems for the transport trolley, supplied and controlled from the elevator cage through flexible conduits towed by the trolley. In this case for operating the elements for grasping the wheeled vehicle a separate drive means is provided.

According to the invention, the operation of the elements for grasping the vehicles to be transported is effected by power means used to move the trolley thus eliminating the necessity of storing energy thereon. Thus, it is possible to reduce the height of the transport trolley which is of particular importance in view of the low ground clearance of various new motor vehicles.

The transport trolley forming the object of the invention is characterized in that the devices for grasping and releasing the wheeled vehicles are connected permanently or intermittently with the propulsion drive of the transport trolley through mechanical, pneumatic or hydraulic elements.

The invention will be further explained hereinafter with reference to examples of embodiments thereof which are represented in their essential parts diagrammatically in the accompanying drawings, wherein:

FIG. 2 is a schematic plan view of the same transport trolley locked on a parking space after actuation of the gripping and guide devices;

FIG. 3 is a schematic plan view of a transport trolley with externally disposed propulsion drive and hydraulically operated gripping and guides devices in the basic position; and FIG. 4 is a schematic plan view of a transport trolley carrying a single motor which serves both for displacing the transport trolley and for operating the gripping and guide devices.

Figure 1:
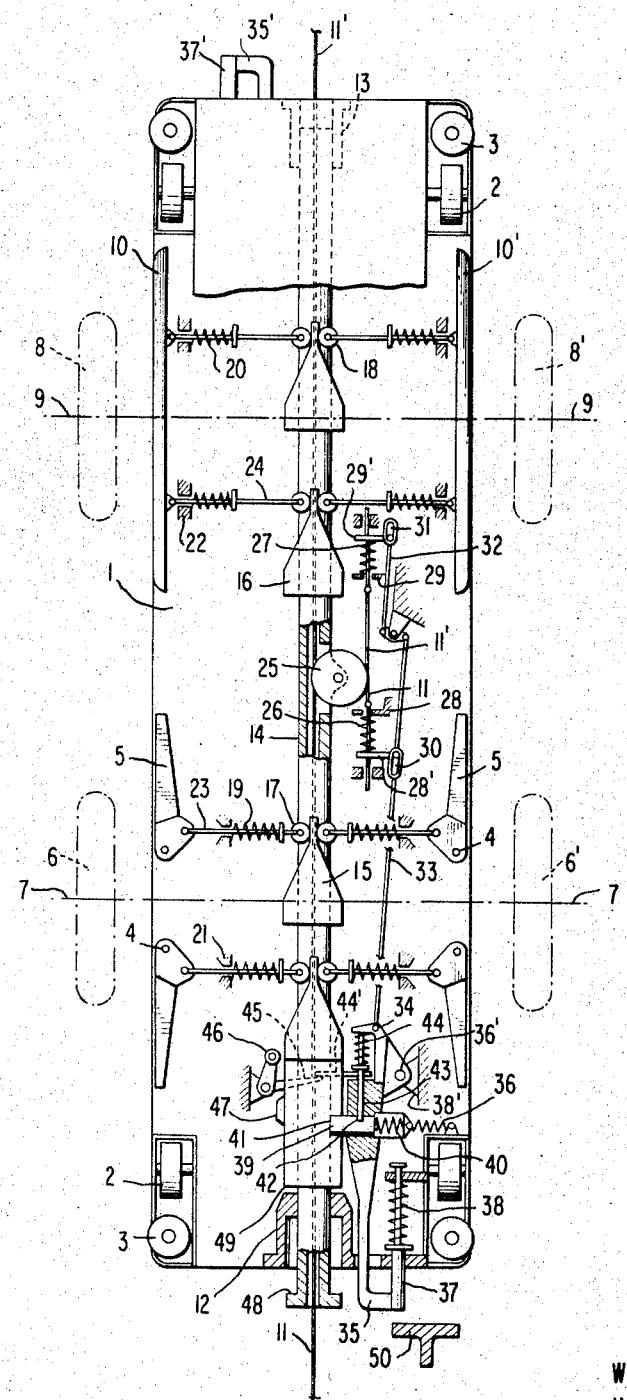
FIG. 1 is a schematic plan view of a transport trolley with externally disposed propulsion drive and mechanically operated gripping and guide devices in the basic position.

Turning now to FIG. 1, there is represented a transport trolley 1 which runs on rollers 2 and is guided by rollers 3 engaging a suitable track channel (not shown). Arms 5 known per se for grasping the wheels 6, 6' of an axle 7 of the vehicle to be parked are mounted on the joints 4.

The wheels 8, 8' of the other axle 9 of the vehicle are guided in known manner by rails 10, 10'. The transport trolley is moved in either direction along its longitudinal axis by an externally disposed propulsion drive (not shown) through the traction means or cables 11, 11' in a manner described hereinafter. In the transport trolley there is arranged for limited displacement an operating rod 14 confined by opposed guides 12, 13. The operating rod 14 carries wedges 15, 16 against which the rollers 17, 18 are urged by means of springs 19, 20 engaging the trolley frame at 21, 22.

The rollers 17 are connected through a linkage 23 with the pivotable arms 5 for grasping the vehicle wheels 6, 6', while the rollers 18, associated with the linkages 24, are connected with the guide rails 10 for extending them as far as the wheels 8, 8' of the other axle 9 of the vehicle to be parked. It is to be understood that arms 5, instead of being pivotally attached, may be constructed to move linearly similarly to guide rails 10.

The traction means 11, 11' are trained about pulley 25 mounted in the operating rod 14 and are supported through springs 26, 27 against stationary retaining elements 28, 29 in the transport trolley. Springs 26 and 27 are disposed between respective retaining elements 28, 29 and spring seat plates 28', 29' secured to traction means 11, 11', respectively. The plates 28', 29' of the springs 26, 27 are provided with pegs 30, 31 which engage in slots of a linkage 32, 33 which is articulately secured on the rear end 34 of a locking lever 35.

Lever 35 is urged by a tension spring 36 against an operating bolt 37 which is urged by a spring 38 into a position as shown in FIG. 1. Lever 35 is swingably held by pivotal joint 36' of a bracket 38' fixedly secured to trolley 1.

Referring further to FIG. 1, the trolley 1 is depicted in an empty condition with arms 5 and guide rails 10 retracted. The trolley is moved in its length direction by exerting a substantially constant external pulling force on either cable (or traction means) 11 or 11' depending on the desired sense the trolley is to be moved. The pulling force is transmitted through pulley 25 to operating rod 14. The operating rod 14 is locked in its position in relation to the transport trolley by a locking bolt 39 mounted movably in the locking lever 35. Thus, the pulling force applied to cables 11 or 11' is not displacing the operating rod 14 but draws the entire transport trolley 1 in the direction of the pulling force. The locking bolt 39, which is forced under the action of a spring 40 into a recess 41 of the operating rod 14, has a notch 42 in which a locking pin 43, also mounted in the locking lever 35, engages by means of a spring 44. With the locking pin 43 there is associated a release lever 44' adapted to be engaged by an arm 45 of a bell-crank lever, the other arm of which carries a roller 46 operable by a dog 47 (secured to operating rod 14) upon the displacement thereof with respect to trolley 1 as it will become apparent hereinafter.

The operating rod 14 is movable with respect to trolley 1 through a limited distance defined by the point of abutment of shoulder 48 with the inside of guide 12 and the point of abutment of shoulder 49 with the outside of guide 12.

The trolley 1 engages the wheels of a vehicle in the following manner:

The empty trolley is drawn (with arms 5 and rails 10 retracted) by means of cable 11 towards stop 50 between the wheels 6, 6', 8, 8' of a waiting vehicle. As the trolley continues its travel, stop 50 pushes operating bolt 37 inwardly against spring 38 releasing lever 35 which, urged by spring 36, swings about pivotal joints 36'. As a result, the terminal hook of lever 35 engages behind stop 50 and locking bolt 39 (having moved with lever 35 as a unit) is lifted out of recess 41 of operating rod 14. If now a force directed away from stop 50 is applied to the traction means 11' with a corresponding slackening of the line 11, the operating rod 14 is shifted (the trolley itself still being hooked to stop 50) and as a result, the arms 5 are pivoted out by means of the wedge drive arrangement 15, 17, 19, 23, thus, the wheels 6, 6' are grasped. At the same time the guide rails 10 are pushed out by means of the wedge drive arrangement 16, 18, 20, 24 for the guidance of the wheels 8, 8'. Simultaneously, as the operating rod 14 moves, the dog 47 secured thereon shifts the roller 46 whereupon lever 45 draws the locking pin 43 out of notch 42 allowing the locking bolt 39 to move outwardly from the locking lever 35 and to slide, urged by spring 40, along the side of operating rod 14 until it engages behind the shoulder 49. Thus, once again the operating rod 14 is locked with respect to trolley 1, but this time in its other extreme position with arms 5 and rails 10 in operative locking engagement with wheels 6, 6', 8, 8' of the vehicle. The apparatus is now in the position as depicted in FIG. 2. An external force now applied to cable 11' and directed away from stop 50 will be transmitted through the locked operating rod 14 to the still stationary trolley 1. The accelerating forces in the cable 11' will briefly overcome the powerful dimensioned springs 26 and 27. As a result, cables 11, 11' will be momentarily and slightly displaced with respect to trolley 1 in a direction away from stop 50. At the same time, spring seat plate 28' is displaced in the same direction, exerting a momentary pulling force on linkage 33 and thus upon the end 34 of the locking lever 35, so that the latter is drawn out from behind the stop 50 against the tension spring 36 and moved clockwise. The clockwise pivoting motion of lever 35 about pivotal joint 36' has the following two results: (1) it frees the trolley from its engagement with stop 50 and (2) by forcing the locking bolt 39 (engaged behind shoulder 49) inwardly into lever 35, locking pin 43 will drop into notch 42 thus locking the bolt 39 with respect to the lever 35. The acceleration forces without delay will also set the loaded transport trolley in motion away from stop 50 thus releasing the operating bolt 37 which places itself beneath the nose of the locking lever 35. At this time the relative position of bolt 39 with respect to lever 35 and the position of the latter with respect to operating bolt 37 is the same as shown in FIG. 1. The bolt 39, however, is engaged behind shoulder 49 as shown in FIG. 2 and not in recess 41 as depicted in FIG. 1.

If now the trolley 1 carrying a motor vehicle by means of the extended arms 5 and the extended guide rails 10 arrives at a parking space provided with a stationary stop 50, the latter will push the operating bolt 37 inwardly of trolley 1 releasing the lever 35 and thus permitting it to pivot counterclockwise about joint 36'. As a result, the hook-shaped terminal portion of lever 35 will engage behind the stop 50. Also, the locking bolt 39, moving with lever 35 as a unit, will move away from behind the shoulder 49. A continuing pulling force exerted on cable 11 in the direction of stop 50 will now cause a displacement of the operating rod 14 in that direction. The shifting of operating rod 14 with respect to trolley 1 causes the wedge drive arrangements 16, 18, 20 and 24 to be disengaged whereby the arms 5 and the guide rails 10 are pulled back into their position shown in FIG. 1. Further, dog 47 of the operating arm 14 will actuate the roller 46 causing arm 45 to displace the release lever 44' whereby the locking pin 43 is withdrawn from the notch 42 of locking bolt 39. As the operating rod 14 continues its travel with respect to trolley 1, the operating bolt 39, urged by spring 40, rides against the outer face of the operating rod 14. As the operating rod 14 reaches its extreme position as shown in FIG. 1, the locking bolt 39 snaps into the recess 41. At this time, the relative position of lever 35 with respect to operating bolt 37, locking bolt 39 and stop 50 is as shown in FIG. 2, while the relative position of the locking bolt 39 with respect to operating rod 14 is as shown in FIG. 1.

It may now be desired to pull the trolley 1 (with the arms 5 and guide rails 10 retracted as shown in FIG. 1) in an unloaded condition from under the deposited vehicle. For this purpose a pulling force is exerted on cable 11' in a direction away from stop 50. Since the locking bolt 39 is in recess 41 of the operating rod 14, there is no displacement of the latter: the pulling force is transmitted to the stationary trolley 1. Again, as described hereinbefore, the accelerating forces in the cable 11' will briefly overcome the force of springs 26 and 27. As a result, cable 11, 11' will be momentarily and slightly displaced with respect to trolley 1 in a direction away from stop 50. At the same time spring seat plate 28' is displaced in the same direction exerting a momentary pulling force on linkage 33 and thus on the end 34 of the locking lever 35 so that the latter is drawn out from behind the stop 50 against the tension spring 35 and moved clockwise. The clockwise pivoting motion of lever 35 about pivotal joint 36' has the following two results: (1) It frees the trolley from its engagement with stop 50, and (2) by forcing the locking bolt 39 (engaged in the recess 41 of operating rod 14) inwardly into lever 35, locking pin 43 will drop into notch 42 thus locking the bolt 39 with respect to the lever 35. The acceleration forces without delay will also set the empty transport trolley 1 in motion away from stop 50 thus releasing the operating bolt 37 which places itself beneath the nose of the locking lever 35. Now the relative position of all parts with respect to one another is as shown in FIG. 1. The empty trolley is now ready to be directed to another parking space for picking up a waiting vehicle.

Turning once again to FIG. 1, there is shown a locking lever 35' and an adjacent operating bolt 37' both disposed at the end of trolley 1 remote from lever 35 and operating bolt 37. Lever 35' is connected by simple linkage means (not shown) to locking lever 35 and operating bolt 37' is connected by simply linkage means (not shown) to the operating bolt 37. The linkage means (not shown) connecting operating bolt 37' with operating bolt 37 ensures that if the operating bolt 37' abuts against a stop adjacent that end of the trolley, its inward motion will be duplicated by the operating bolt 37. The linkage means (not shown) interconnecting locking lever 35' with locking lever 35 ensures that when lever 35 is actuated by means described hereinbefore, its motion will be duplicated by locking lever 35'. It is thus seen that the provision of locking lever 35' and operating bolt 37' makes possible to draw the trolley 1 into a parking space with either end first.

In FIG. 3 there is represented another embodiment of the transport trolley. It differs from the embodiment shown in FIGS. 1 and 2 only by different transmission means for the operating devices for grasping and releasing the wheels of a vehicle to be parked. Unlike in the previously described embodiment, here the operating rod 14 does not carry wedges but shoulders 51, 52, which by means of piston rods 53, 54 force hydraulic oil out of the cylinders 55, 56 into the cylinders 57, 57' for pivoting out the arms 5 for the purpose of grasping the vehicle wheels 6, 6' and into the cylinders 58, 58' for pushing out the guides 10, 10' against the vehicle wheels 8, 8'. The operation may also be effected pneumatically in a similar manner. The structural and operational features of the unlocking and locking mechanism are identical to those described in detail hereinbefore.

In FIG. 4 there is shown the invention applied to a transport trolley which is provided with its own drive means. The basic chassis 60 runs on the undriven rollers 61 and is driven through the drive wheels 62, which are connected through an axle 63 and and a gearing 64 with a clutch 65 associated with a clutch switch 66. The drive wheels 62 may be stopped by means of a brake 67 through the gear branch 63, 64, 65. The drive is effected by a motor 68, which, according to the invention, after the trolley has moved a fixed distance, also actuates arms 80, 80' and guide rails 83, 83' for grasping or releasing the vehicles.

For the operation of the arms 80, 80' the motor 68 is connected to a threaded spindle 69 on which a nut 70, prevented from rotation by guides 71, may travel longitudinally. The nut carries cones 72, 72' on both sides, which are adapted to engage in counter-cones 73 or 73', when the nut 70 moves to either end of the spindle 69. These counter-cones are coupled with pinions 74, 74' which through wheels 75, 75' drive the shaft 76 to which the worm gearings 77, 78, 78' are connected. The gearing 77 through the screw gearings 79, 79' effects the pivotal movement of the gripping arms 80, 80' about the pivot points 81, 81' mounted in the chassis 60.

The gearings 78, 78' are connected through screw gearings 82, 82' with the rails 83, 83' for the guidance of the vehicle wheels. Switches 84, 84' arranged on the nut guide 71 effect the disconnection of the clutch 65 and the actuation of the brake 67. The transport trolley works as follows:

In the basic position, for example, in the cage of an elevator, the nut 70 is in the middle position as illustrated. If now, as viewed in FIG. 4, the transport trolley is to be shifted, for example, downwardly (with wheels 61 leading) for the purpose of grasping a vehicle in a parking space, the clutch 65 is closed through the switch 66, the brake 67 is released and the motor 68 is energized. This moves the drive wheels 62 through the gear branch 65, 64, 63 and sets the transport trolley in motion. The motor 68 also drives spindle 69 causing the nut 70 to move, for example, in the downward direction. The pitch height and rotational speeds are so selected that when the parking space is reached, the nut also has reached its extreme position on spindle 69 whereby the cone 72 is pressed into the counter-cone 73. At the same time the switch 84 de-energizes the drive motor 68, disconnects the clutch 65 and actuates the brake 67. For the grasping of the vehicle wheels the motor 68 is switched on in the appropirate direction. Through the now frictionally engaged cone 72 and counter-cone 73 and gearings 74, 75 the motor 68 sets the shaft 76 in motion, which, through the gearings 77, 79, 79' causes an outward swing of the arms 80, 80' for grasping the wheels and through the gearing 78, 78' causes an outward linear motion of the guides 83, 83'.

In order that different travelling distances of the transport trolley may be taken into consideration, the coupling parts 73, 73' and 72, 72' are adjustable in the axial direction.

When the loaded transport trolley is to be moved away from the parking space, for example, into the cage of an elevator, the clutch 65 is closed and the brake 67 is released. When the motor 68 is energized to rotate in the opposite direction, the cone 72 disengages from the counter-cone 73 by withdrawal of the nut 70, while the arms 80, 80' and guides 83, 83' remain unchanged in their extended position carrying the engaged vehicle. If the latter is to be brought to an exit located on the other side, the nut 70 will shift upward (the position of brake 67 and clutch 65 being unchanged) until the cone 72' engages in the counter-cone 73'. At this instant the switch 84' de-energizes the motor 68, disconnects the clutch 65 and actuates the brake 67 in order to block the transport trolley. By energizing the motor again in the appropriate direction, the frictionally engaged cone 72' and counter-cone 73' rotate the shaft 76 through gearings 74', 75' retracting thereby the arms 80, 80' and guide rails 83, 83' through the worm gearings 77, 78, 78'.

In place of the worm gearings 77, 78, 78' as illustrated, other gearings may be selected. The former have, however, the advantage that, with appropriate selection of the pitch of the worms and spindles, they remain self-locking in the position reached in each case and additional brakes are not necessary for holding fast the gripping arms and guide rails.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

What we claim is:

1. In a transport trolley of the type adapted to carry motor vehicles, said trolley having extensible and retractable wheel engaging means, said trolley being moved between loading and unloading locations by a propulsion force delivered by a power source remote from said trolley, the improvement comprising mechanical means disposed on said trolley for extending and retracting said vehicle wheel engaging means, said mechanical means actuated solely by said propulsion force when said trolley is stationary in one of said locations, said mechanical means including:
   (A) traction means directly exposed to said propulsion force,
   (B) control rod means shiftably held in said trolley and adapted to assume a first position and a second position,
   (C) means affixed to said control rod means for extending said wheel engaging means when said control rod means moves from said first position towards said second position and for retracting said wheel engaging means when said control rod means moves from said second position towards said first position, and
   (D) securing means adapted to assume a locking state for locking said control rod means with respect to said trolley in said first and second positions, said securing means adapted to assume a withdrawn state for unlocking said control rod means with respect to said trolley upon arrival thereof at one of said locations, said traction means, when exposed to said propulsion force, adapted to move said control rod means from one of said positions into the other when said control rod means is unlocked with respect to said trolley, said traction means, when exposed to said propulsion force, adapted to move said trolley through said control rod means when the latter is locked with respect to said trolley.

2. A trolley as defined in claim 1, wherein said securing means, when in said withdrawn state, is adapted to anchor said trolley to said location upon arrival of said trolley thereat, releasing means connected to said traction means and to said securing means for releasing said trolley with respect to said location when said traction means is exposed to said propulsion force while said trolley is anchored to said location.

3. In a transport trolley of the type adapted to carry motor vehicles, said trolley having extensible and retractable wheel engaging means, said trolley being moved between loading and unloading locations by a propulsion force delivered by a power source including a motor affixed to said trolley, said trolley further including driven means mounted on said trolley and adapted to be exposed to said propulsion force for moving said trolley, the improvement comprising, clutch means between said driven means and said motor, switch means for actuating said clutch means, mechanical means disposed on said trolley for extending and retracting said vehicle wheel engaging means, said mechanical means actuated solely by said propulsion force when said trolley is stationary in one of said locations, said mechanical means including nut means movable by said motor, said nut means adapted to travel to a first extreme position and to a second extreme position depending upon the sense of rotation of said motor, said nut means, when in said first extreme position, causing said vehicle wheel engaging means to be extended, said nut means, when in said second extreme position, causing said vehicle wheel engaging means to be retracted, said nut means, upon its arrival into either of said extreme positions adapted to operate said switch means for actuating said clutch means to disconnect said driven means from said motor thereby causing stoppage of said trolley, said nut means, upon its departure from either of said extreme positions adapted to operate said switch means for actuating said clutch means to connect said driven means to said motor thereby causing movement of said trolley.

4. A trolley as defined in claim 3 including brake means associated with said driven means, said brake means adapted to be applied to said driven means upon disconnection of said driven means from said motor by said clutch means, said brake means adapted to be released upon connection of said driven means to said motor by said clutch means.

References Cited

UNITED STATES PATENTS

| 2,016,662 | 8/1935 | Aitken. | |
|---|---|---|---|
| 3,038,621 | 6/1962 | Mitchell | 214—333 |
| 3,174,638 | 3/1965 | Dechant | 214—16.1 X |

FOREIGN PATENTS 825,213   12/1959   Great Britain.

HUGO O. SCHULZ, *Primary Examiner.*